M. HERMANSEN & A. TYGERSON.
ELECTRICALLY HEATED GRATE.
APPLICATION FILED MAY 11, 1908.

931,605.

Patented Aug. 17, 1909.

WITNESSES
E. N. Schofield
S. M. Gallagher

INVENTORS
Marcus Hermansen
Andrew Tygerson
BY
W. Preston Williamson
ATTORNEY

UNITED STATES PATENT OFFICE.

MARCUS HERMANSEN AND ANDREW TYGERSON, OF EPHRAIM, UTAH.

ELECTRICALLY-HEATED GRATE.

No. 931,605.  Specification of Letters Patent.  Patented Aug. 17, 1909.

Application filed May 11, 1908. Serial No. 432,201.

*To all whom it may concern:*

Be it known that we, MARCUS HERMANSEN and ANDREW TYGERSON, citizens of the United States, residing at Ephraim, county of Sanpete, and State of Utah, have invented a certain new and useful Improvement in Electrically-Heated Grates, of which the following is a specification.

Our invention relates to new and useful improvements in electrically heated grates, to be placed at the intake of pipe lines for water power plants, and has for its object to provide an exceedingly simple and effective device of this character by means of which the ice which collects against the grate will be melted, thus allowing the water to freely pass through the grate in the coldest weather.

Another object of our invention is to prevent the water from freezing upon the grate bars, thus clogging the intake of the pipe lines.

With these ends in view this invention consists in the details of construction and combination of elements hereinafter set forth and then specifically designated by the claims.

In order that those skilled in the art to which this invention appertains may understand how to make and use the same we will describe its construction in detail referring by letter to the accompanying drawing forming a part of this specification, in which—

Figure 1:
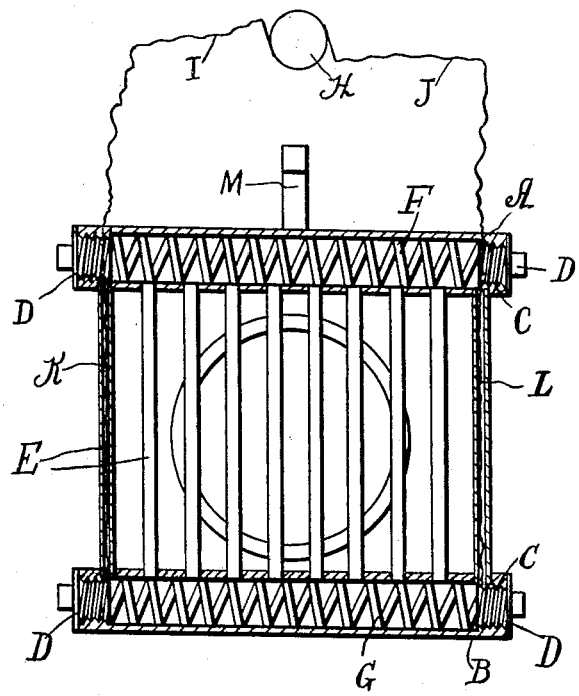
Figure 2:
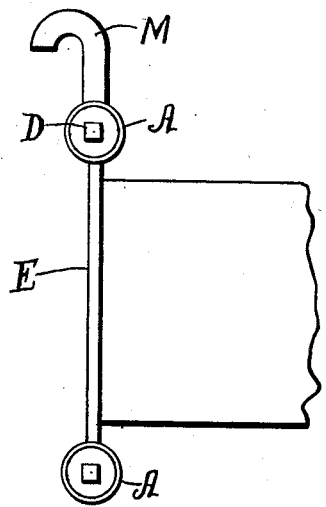

Figure 1 is a sectional view of our improved electrically heated grate, and Fig. 2 is an end view thereof.

In carrying out our invention as here embodied, A and B represent two pipes, having the threads C cut in the ends thereof to allow the plugs D to be threaded therein, these pipes are joined together by smaller pipes E which form the grate bars. In the two pipes A and B are placed the heat coils F and G, the heat coil F is connected to the motor H by means of the wires I and J and the heat coil G is connected thereto by means of the wires K and L which pass through two of the smaller pipes. In order that the grate may be drawn from the water we secure a hook M to the upper pipe A.

In practice the heat coils F and G will be placed within the pipes A and B, then the plugs C will be threaded on the ends of the pipes, thus preventing any water from entering the said pipes and also keeping the heat within.

It will be readily understood that when the current is turned into the heat coils they will heat the pipes A and B and from these the heat will pass along the pipes E thus preventing the water from freezing thereon and melting any ice which may come in contact with them.

Of course we do not wish to be limited to the exact construction here shown as the grate might be made circular or some other suitable shape, and instead of using electricity as the source of heat the grate might be connected with suitable pipes so as to supply it with steam or hot air.

Having thus fully described our invention what we claim as new and useful is;—

1. In combination, two pipes, plugs threaded in the ends thereof thus preventing water passing in the same when submerged, smaller pipes the ends of which are secured to the larger pipes, and means for heating said pipes, substantially as shown and described.

2. In combination, two pipes, the ends of which are threaded, plugs threaded in the ends of said pipes, heat coils secured in said pipes, smaller pipes the ends of which are secured to the larger ones thus forming a grate, a hook secured to the upper pipe to assist in raising the grate, and means for supplying the heat coils with electricity, as shown and described.

3. In combination, two pipes the ends of which are threaded, heat coils placed therein, plugs threaded in said pipes, smaller pipes secured to the larger ones for forming a grate, a hook secured to the upper pipe to assist in the raising of the grate, wires passing through two of the smaller pipes for connecting the two heat coils, and a second set of wires for carrying the electricity from the motor to the coils, as shown and described.

In testimony whereof: we have hereunto affixed our signatures in the presence of two subscribing witnesses.

MARCUS HERMANSEN.
ANDREW TYGERSON.

Witnesses:
S. M. GALLAGHER,
C. G. CALLAHAN.